United States Patent
Kenney et al.

(10) Patent No.: US 7,519,585 B2
(45) Date of Patent: Apr. 14, 2009

(54) SELECTION CONTEXT FILTERING

(75) Inventors: Adam R. Kenney, Seattle, WA (US); Clinton D. Covington, Kirkland, WA (US); Scott T. Gardner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/316,090

(22) Filed: Dec. 19, 2005

(65) Prior Publication Data

US 2006/0101013 A1 May 11, 2006

Related U.S. Application Data

(63) Continuation-in-part of application No. 10/956,866, filed on Sep. 30, 2004, now abandoned.

(51) Int. Cl.
*G06F 17/30* (2006.01)
*G06F 7/00* (2006.01)
(52) U.S. Cl. ............................................. 707/4; 707/3
(58) Field of Classification Search .............. 707/1–206
See application file for complete search history.

(56) References Cited

U.S. PATENT DOCUMENTS

| | | | | |
|---|---|---|---|---|
| 5,701,453 A * | 12/1997 | Maloney et al. | ................ | 707/2 |
| 5,787,411 A * | 7/1998 | Groff et al. | ..................... | 707/2 |
| 5,963,938 A * | 10/1999 | Wilson et al. | .................. | 707/4 |
| 6,122,627 A * | 9/2000 | Carey et al. | ..................... | 707/4 |
| 6,279,016 B1 * | 8/2001 | DeVorchik et al. | ......... | 715/210 |
| 6,473,751 B1 * | 10/2002 | Nikolovska et al. | ............ | 707/3 |
| 6,484,164 B1 * | 11/2002 | Nikolovska et al. | ............ | 707/3 |
| 6,499,029 B1 * | 12/2002 | Kurapati et al. | ................ | 707/5 |
| 6,505,194 B1 * | 1/2003 | Nikolovska et al. | ............ | 707/3 |
| 6,662,177 B1 * | 12/2003 | Martino et al. | ................. | 707/3 |
| 6,785,668 B1 * | 8/2004 | Polo et al. | ....................... | 707/2 |
| 7,162,471 B1 * | 1/2007 | Knight et al. | .................. | 707/3 |
| 2003/0065650 A1 * | 4/2003 | Annand et al. | ................. | 707/3 |
| 2005/0165841 A1 * | 7/2005 | Kasperkiewicz et al. | . | 707/104.1 |
| 2007/0208709 A1 * | 9/2007 | Annand et al. | ................. | 707/3 |

OTHER PUBLICATIONS

Notice of Office Action, App. No. EP 05 105 142.3, European Patent Office, mailed Oct. 22, 2008.

* cited by examiner

*Primary Examiner*—John E Breene
*Assistant Examiner*—Joshua Bullock
(74) *Attorney, Agent, or Firm*—Merchant & Gould PC

(57) ABSTRACT

A method and system for the graphical formulation of filter queries is disclosed which enables data queries to be easily chosen via selection from a menu. A signal is received to filter, or query, a data table. Next, the context of a selection of data is analyzed, and a menu of filters based on that context is formulated and displayed. A filter selection is received, and the corresponding filter is executed. The results of the filter are displayed on the screen.

16 Claims, 11 Drawing Sheets

SELECTION CONTEXT FILTERING

CROSS REFERENCE TO RELATED APPLICATIONS

This application is a continuation-in-part application of prior U.S. application Ser. No. 10/956,866, filed Sep. 30, 2004, now abandoned entitled "Easy-To-Use Data Context Filtering," and assigned to Microsoft Corporation.

TECHNICAL FIELD

The present invention relates generally to the field of software applications. More particularly, the present invention relates to software applications that store and sort data, such as through data queries. More particularly still, aspects of the present invention relates to filtering of the data returned from query results.

BACKGROUND OF THE INVENTION

In order to manage large quantities of data, computer software applications, such as spreadsheet and database applications have been developed to organize and store the data in a logical manner. Typical spreadsheet and database applications comprise a large number of records of information, wherein each record comprises a predetermined number of fields. In the context of a database, a database management system is typically used to provide the software tools to manipulate the database more simply. Example database management systems include Microsoft® Access, and Microsoft® SQL Server, among others. Databases generally allow users to establish complex data interrelationships that are not available in spreadsheets, which increases their power. Unfortunately, this increased power also tends to make database applications even more difficult for new users to master.

A typical database management system provides the user the ability to add, modify or delete data, and the ability to query, sort, or recombine records in the database. Moreover, the usual system also provides functionality related to maintaining the security and integrity of the database data.

Querying large quantities of data in a spreadsheet or database application can be a complex and daunting task, especially to new users. Determining how to specify a data query in a spreadsheet can also be difficult. Database applications can be especially difficult to use, since entire query languages are often used (such as Structured Query Language, or SQL) to enable more complex queries. The language of queries can be intimidating to new users, and thus a more user-friendly query interface is desirable.

It is with respect to these considerations and others that the present invention has been made.

SUMMARY OF THE INVENTION

In accordance with aspects of the present invention, a computer-implemented method is provided for graphical formulation of filter queries. In an embodiment, a signal is received to filter data based on a selection of data. The selected data may include all or a portion of the data within a data field, such as a cell in the table. The context of the selection of data is analyzed. In some exemplary embodiments, the context of the selection of data is based on the data type of the selected data and the location of the selected data within the data field. One or more filter options are generated based on the context. The filter options are displayed. A selection of a filter option may be received and the data is filtered according to the selected filter option.

These and various other features as well as advantages, which characterize the present invention, will be apparent from a reading of the following detailed description and a review of the associated drawings.

BRIEF DESCRIPTION OF THE DRAWINGS

FIG. 1 shows a database environment in which an embodiment of the present invention may be implemented. A tabular view contains unfiltered data. This tabular view of a database management system represents prior art.

FIG. 5 illustrates an example screenshot where a signal to filter has been received, and a filter menu displayed. Unfiltered records may be seen in the background.

FIG. 6 illustrates another example screenshot wherein a particular filter is being selected from a filter menu.

FIG. 7 illustrates another example screenshot wherein the particular filter has been applied to the data, and the resulting filtered records can be seen.

DETAILED DESCRIPTION OF THE INVENTION

Figure 1:
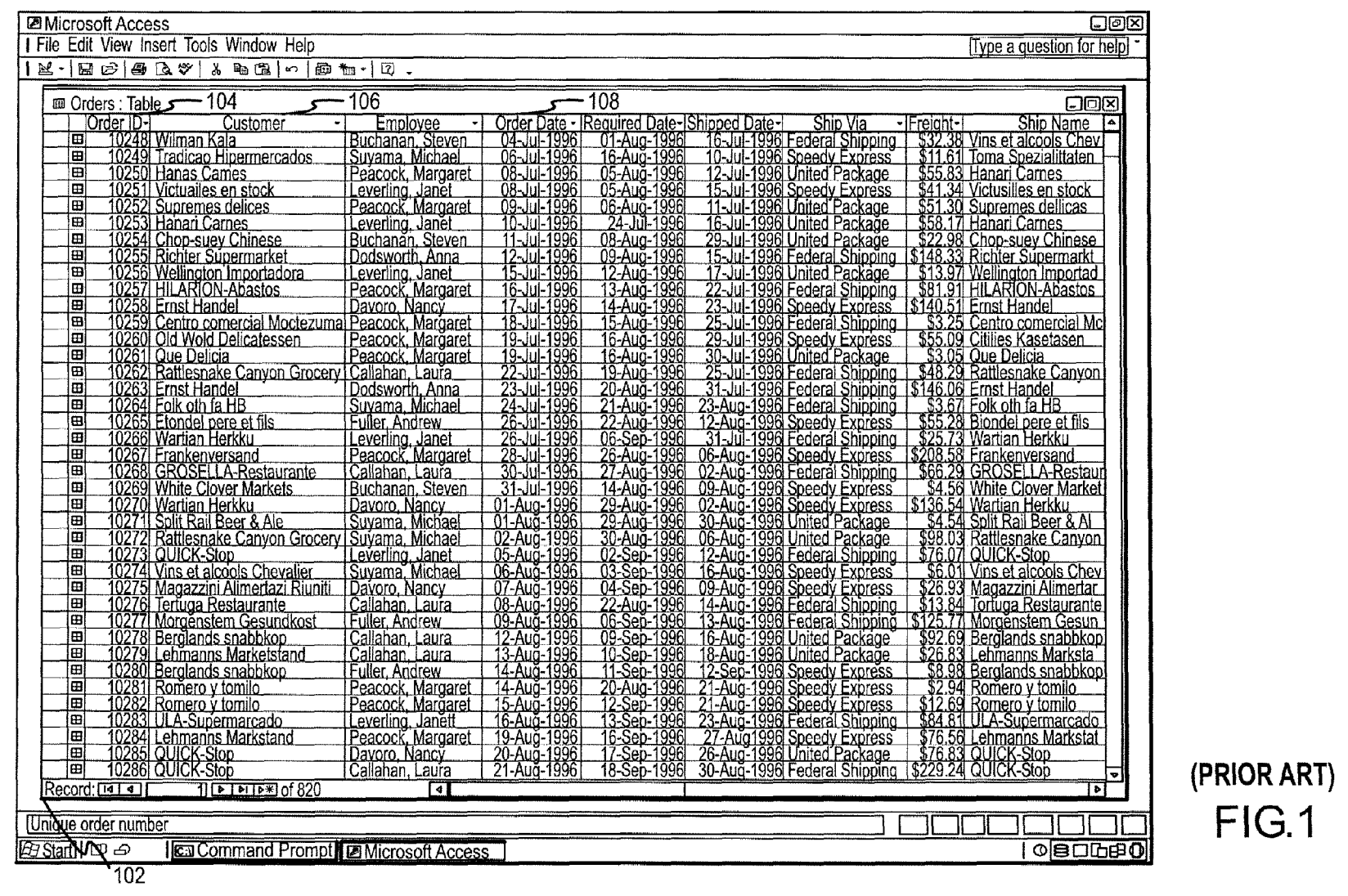

FIG. 1 illustrates a screenshot of a tabular view (also known as a table 102) of a product order database within a database management system. The table 102 includes a table comprised of multiple rows and columns of data. The intersection of a row and column creates a cell, which is an exemplary data field. Each row of data generally comprises a single data record. Generally, each column of data in a database can be counted on to include data elements of a homogenous type. For example, the Order ID column 104 includes data elements in numeric format, the Customer column 106 includes data in the form of alphanumeric strings, the Order Date column 108 includes data in date format, and so on. One skilled in the art will appreciate that many other types of data can be kept in a database, and displayed using a table within a database management system.

Despite the deceptively simple visual presentation of data in FIG. 1, up until now users still have had to manually formulate queries in a suitably structured query language, generally by designing and typing in query commands. So while database management systems may offer a straightforward view of data, formulating effective queries has remained a difficult skill to learn for spreadsheet users new to the world of databases. By allowing "canned" (manufactured in advance) queries to filter data, and allowing a simple query interface, the present invention allows database and spreadsheet products to be more accessible than ever before to new users The present invention may be implemented as a computer process, a computing system, or as an article of manufacture such as a computer readable media. The computer readable media may be a tangible or physical computer storage media readable by a computer system and encoding a computer program of instructions for executing a computer process. The computer program readable media may also be a propagated signal on a carrier readable by a computing system and encoding a computer program of instructions for executing a computer process.

Figure 2:
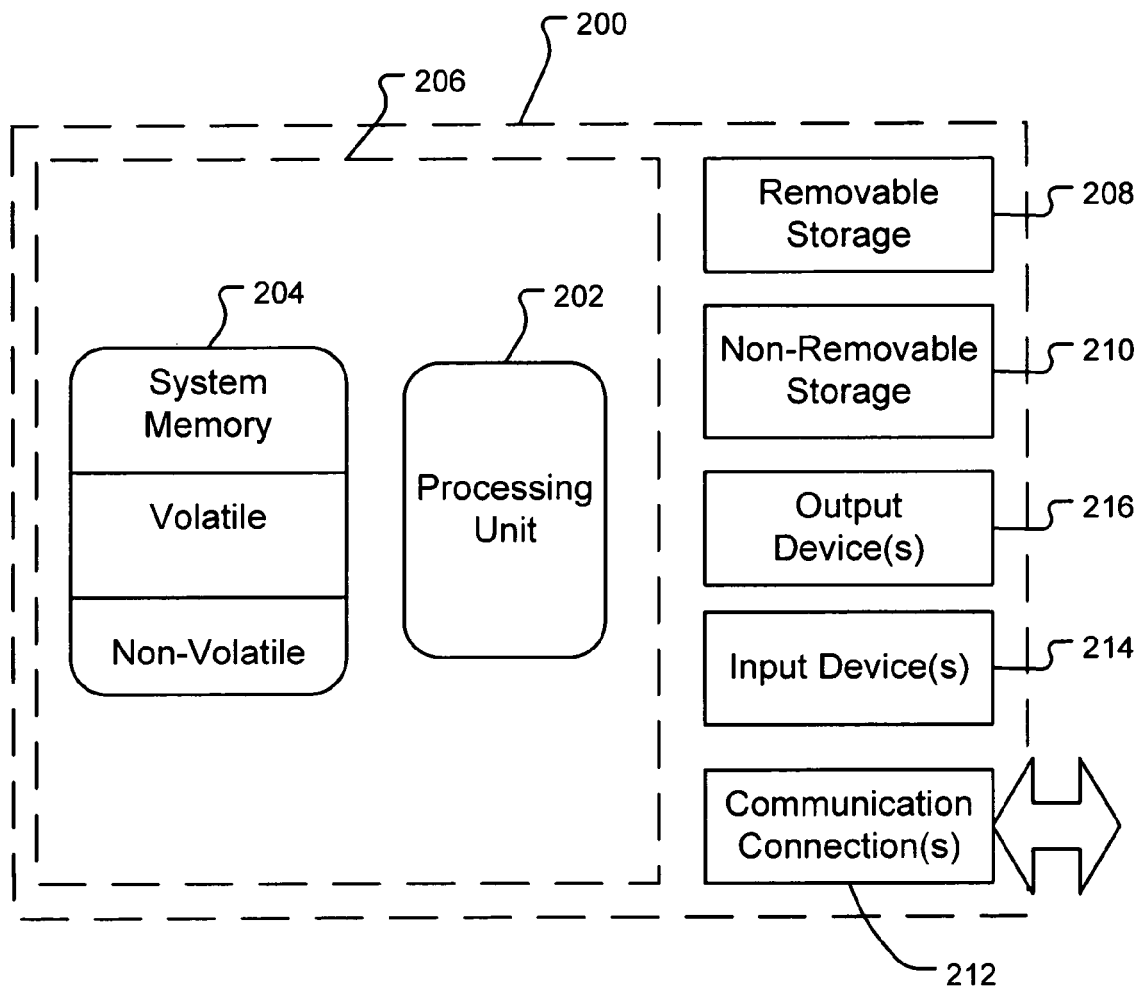
FIG. 2 illustrates an example of a suitable computing system environment on which an embodiment of the present invention may be implemented.

Given that the present invention may be implemented as a computing system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise tangible or physical computer storage media and communication media.

Tangible or physical computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

Figure 3:
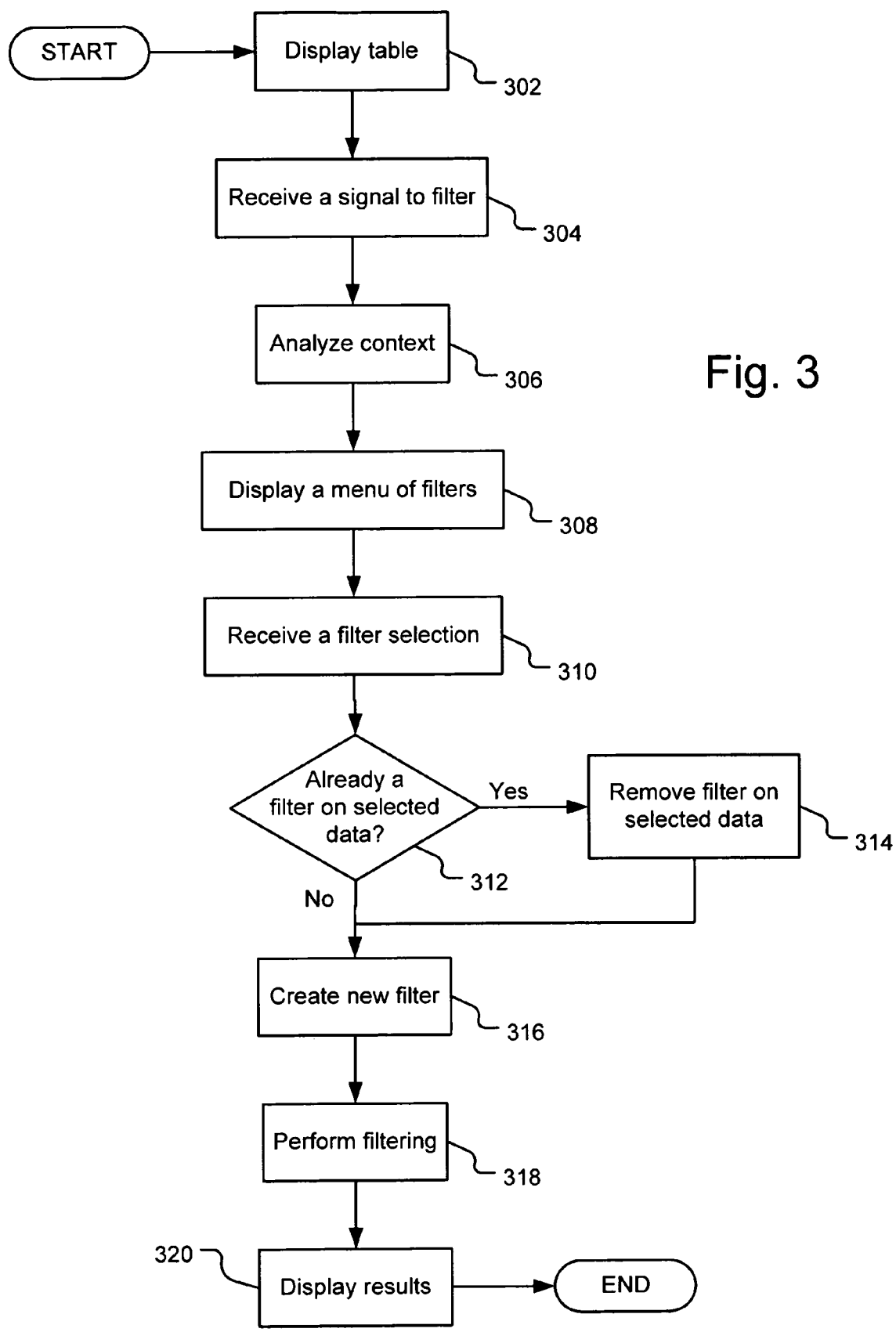
FIG. 3 illustrates the operational flow of the operations performed in one embodiment of the present invention.

FIG. 3 illustrates one embodiment of the invention in which a table is queried using context filtering. In one embodiment of the present invention, display table operation 302 displays a table (such as table 102 in FIG. 1). This table can include practically any type of data. Each column of data generally contains data of a single, homogenous data type, such as a series of dates, alphanumeric strings, or numbers.

Receive operation 304 receives a signal to filter the table data when a user clicks on an appropriate graphical user interface (GUI) control sequence. In one embodiment of the present invention, right-clicking the mouse on a particular column or column header (that column designating the "key field," described below) causes a signal to be sent to receive operation 304. In an alternate embodiment of the present invention, left-clicking on a particular cell (the column the cell falls within then becoming the key field) in the table causes a signal to be sent to receive operation 304. One skilled in the art will appreciate that any number of possible GUI controls or command sequences from an input device can be used to select data of a particular type. Examples include centering the mouse pointer on a given data element, column, or column header, accompanied by activating a certain mouse button. Alternatively, the keyboard could be used to make a selection. Alternatively still, a combination of keyboard, mouse, trackball, or other input device actions could be used to select a data element, column, or column header.

In one embodiment, receive operation 304 may interpret the selection of a cell in a column as a signal to filter based on the entire column's contents. In an alternate embodiment, receive operation 304 may interpret the selection of a cell in a column as a signal to filter based specifically on the contents of that particular cell. The column the selection corresponds to becomes the "key field", which is the column whose value will be used to decide whether each given row is filtered or not. For example, in order to omit from the query results, or "filter out", all orders from table of product order data that were placed before 2004, then the "order date" column must necessarily be a key field for such a query.

When a particular cell is selected (versus an entire column), filter options incorporating the value within the cell are possible (e.g., see example in FIGS. 5, 6, and 7, discussed later).

With respect to an alternative embodiment, data external to the data table can also be incorporated into a filter. For example, filtering out orders in an order data table from "Today" requires external data (namely, today's date) to be retrieved and incorporated into the query, since the current date and time are always changing and thus not practical to store in a data table.

After receive operation 304 receives a signal to filter, analyze context operation 306 analyzes the selected data cell or column to determine what type of data it contains. Data filters appropriate to the determined type of data may then be added to a filter menu 502 (see FIG. 5).

Figure 5:
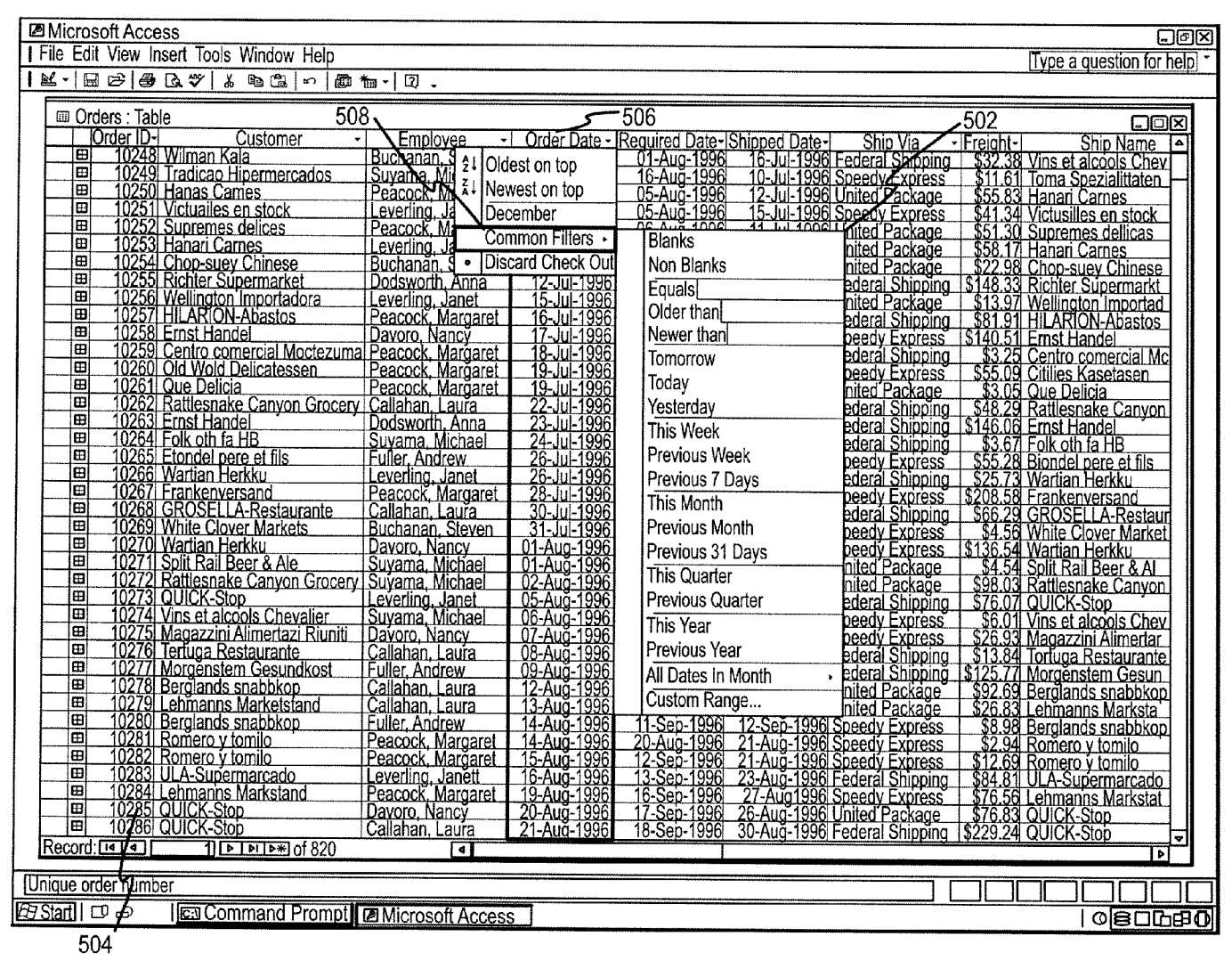

For example, if the data type is determined to be a date, one or more filters appropriate to dates will be added to the filter menu (see 502, FIG. 5 for an exemplary filter menu). Such date-specific filter choices might include "Today," which could be used to filter out all records that do not have a date matching today's date. Similarly, "Yesterday" and "Tomorrow" are also date-specific filter choices that could be added to a filter menu by analyze context operation 304. Other date-specific filter choices might include "This week", "Last month", "Last quarter", "This year", "Past", "Future", etc. Yet other date-specific filter choices might include "Newer than" the date contained in a cell if a particular cell is selected, "Older than" the date contained in a selected cell, or "Same month" as the date contained in a selected cell.

In yet another embodiment, the filter based on dates may involve an "All Dates in Period" filter. For example, user options or choices for this type of filter might include "Quarter 1," and/or "Quarter 2," etc. to display all data associated with selected quarters, irrespective of the year. In yet another example, the choices may include months, such as "January," "February," "March," etc. such that the user may choose these options to show only dates in the selected month period irrespective of the year value. As such, common applications might then review and filter the first quarter sales over the last 5 years or all the birthdays in a given month for these examples, respectively.

In a given embodiment, other type-specific filters may exist for other data types. For example, string-specific filters might include "Is," which may filter out data records that do not match the string contained in a specified cell. Likewise, "is not" may filter out data records that do match the string contained in a specified cell. "Begins with" could be used to filter out records that do not contain a string beginning with a user-specified string, thus allowing for filtering by partially matching a given string. "Contains" may allow for a similar partial search, this type returning elements with strings that contain another given string. "Not blank" may filter out data records containing a blank string in a specified field.

In an alternate embodiment, a list of values appearing in the column is presented to the user. Next to each value is a checkbox, or other control allowing for binary selection. Records containing values that do not match the selected (checked) values will be filtered out.

In another embodiment, number-specific filters enable filtering based on the content of numeric fields. For example, "Smallest 25" may filter out all but the records containing key fields representing the smallest 25 values in a key field. Such a filter may return more than 25 records if a column containing non-unique numbers exists, since SQL reports all numbers that "tie" for highest or lowest status when comparing numbers. For example, filtering out all records but those corresponding to the smallest 25 customer postal zip codes could still include a great many customer records, as many thousands of customers could reside in each postal zip code. As a further example, "Largest 100" would filter out all but the records containing key fields representing the largest 100 values in a key field. "Greater than average" would compute the average of a column of numbers, and then filter out records less than or equal to that average. Similarly, "Less than average" would compute the average of a column of numbers, and then filter out records greater than or equal to that average. In another embodiment, the user could specify two numbers using a "Between" filter, and records containing values not in the range formed by the two numbers would be filtered out.

In yet another embodiment, percentiles could be used to filter numeric values. For example, "Smallest 5 percent" or "Largest 25 percent" could be used to filter numbers based on their value relative to the other numbers in a table.

In one particular embodiment of the present invention, a column containing cells with a very limited choice of values may cause analyze context operation 306 to add the actual values to a filter menu. For example, a column that only allows "Yes" or "No" as possible values may cause analyze context operation 306 to add "Yes" and "No" filter options to a filter menu.

One skilled in the art will appreciate that some filters may be appropriate to multiple data types. For example, "Equals" may be used to filter out all data records that are not equal to the contents of a selected cell. "Equals" may also be used to find a matching date, number, alphanumeric string, boolean value, etc.

In one embodiment of the present invention, analyze context operation 306 may determine that no additional filters need to be added to a filter menu.

Figure 6:
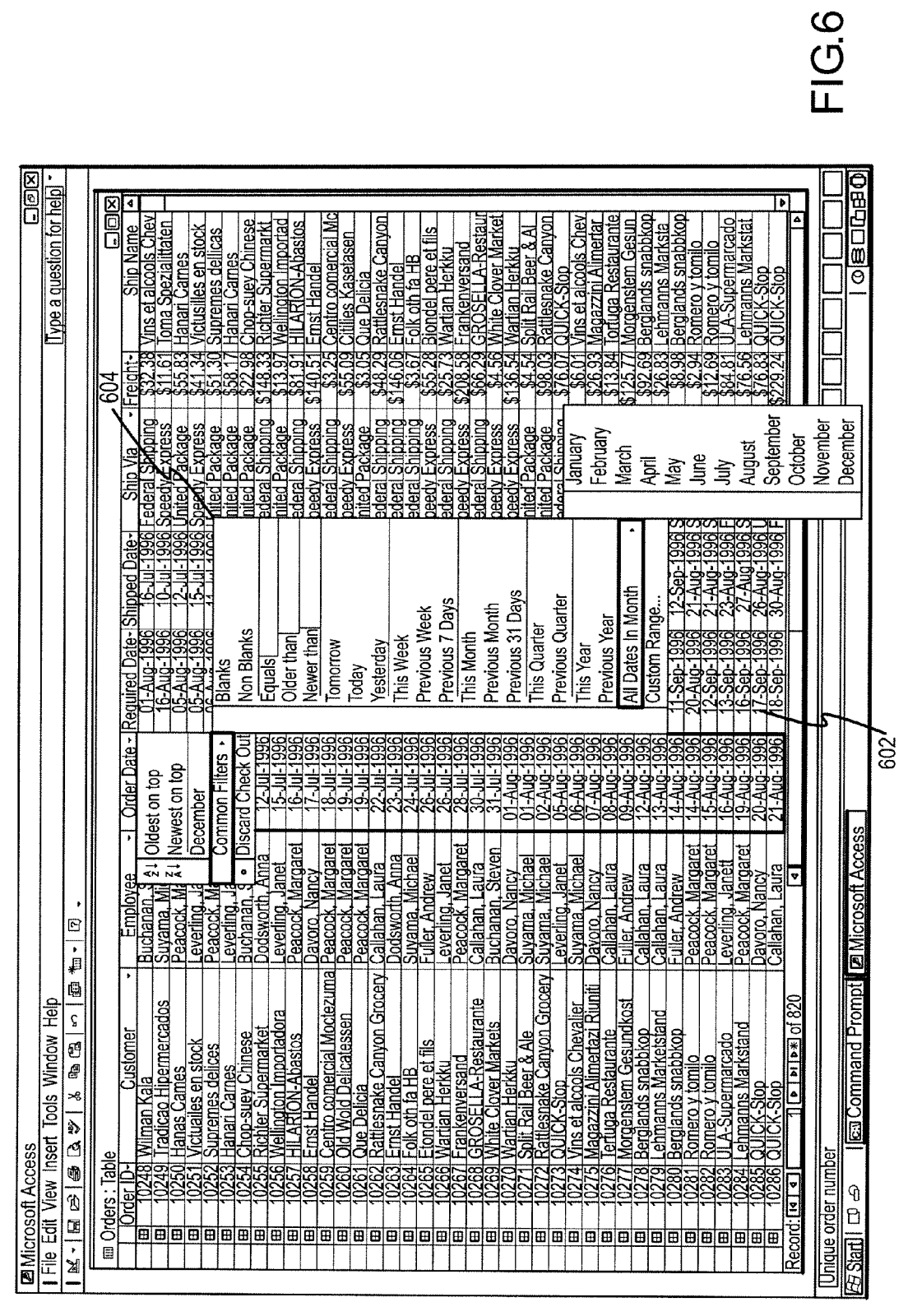

After analyze context operation 306 adds any appropriate filters to a filter menu, display operation 308 displays the menu of filters (for an example of a filter menu, see 602 in FIG. 6). The menu of filters displayed by display operation 308 may include default filters appropriate for all data types (such as "Equals", discussed above).

Once a filter menu has been displayed, receive operation 310 receives a filter selection. In one embodiment, this selection is made by hovering a mouse pointer over a given filter in a filter menu, and clicking a mouse button. However, one skilled in the art will appreciate that any number of input device sequences could be use to select a filter from a filter menu without departing from the scope of the claimed invention.

After a filter selection has been received, determine operation 312 determines whether a filter already exists for a selected table column. If a filter does already exist for a selected table column, flow branches YES to remove operation 314. However, if no filter exists for a selected table column, flow branches NO to create operation 316.

In an embodiment of the current invention, two filters cannot be applied to the same table column, so if determine operation 312 determined that a filter already exists for a selected table column, then remove operation 314 is used to remove that filter to make way for a new one.

If no filter existed for the specified table column, or if a filter did exist and was removed by remove operation 314, create operation 316 next creates a new filter. This new filter includes a query encoded in a query language, such as SQL.

In an alternative embodiment of the present invention, multiple filters can be applied to the same table column, as long as those filters are not mutually exclusive.

In an embodiment involving a database, a filter query may be created that incorporates an SQL "where" qualifier. A where qualifier, when added to an SQL query, may be used to conduct a search or narrow down the results of a query. For example, appending "where Country=Lithuania" to the end of an SQL query will cause the query to return only results whose Country column value is equal to "Lithuania". Likewise, appending "where OrderID=41475" to an SQL query will cause the query to return only results whose OrderID is equal to 41475. In this way, the where qualifier can be used to return arbitrarily wide or narrow lists of records that match the query.

One skilled in the art will appreciate that, in addition to locating full matches, the where qualifier can also be used to find partial matches to query through the use of a regular expression, a search tool well known in the field. For example, a where query could be modified to query all records with a Country value starting with "L". Likewise, specific ranges of numbers and/or dates can also be queried using the SQL where qualifier.

In another embodiment, a filter may incorporate an SQL "top" qualifier. This may be used to instruct a query to only return an arbitrary number of the top or bottom entries. For example, by adding Top (5) to a sales database query, only the top 5 sales figures will be returned for a given query instead of all sales. In the event of a tie, the exemplary sales database would return more than 5 records.

One skilled in the art will appreciate that the where and top SQL qualifiers are provided as exemplary embodiments only, and other query qualifiers could be used in constructing a query without departing from the scope of the claimed invention. Further, some embodiments involve a spreadsheet, which may lack a query language, and instead perform queries directly upon the data.

In one embodiment involving a database, a filter query containing the appropriate SQL qualifiers is created, and stored in memory for further modification and/or later use.

In one embodiment of the present invention, create operation 316 may also select a given filter on a filter menu by causing it to be highlighted whenever the filter menu is displayed.

After a filter is created, perform operation 318 performs filtering based on that filter. In a database embodiment, the query created by create operation 316 is issued to the database by the database management system in a query language. In another embodiment, the filtering is performed directly by the application. The results may be stored in memory, or directed to display operation 320 (discussed below) for rendering.

Display operation 320 renders the query results yielded by perform operation 318 on the screen. The results may be read from memory, piped directly to display operation 320 by perform operation 318, or otherwise transmitted to display operation 320 for rendering. The results are rendered in place of the original, unfiltered table.

In an alternate embodiment of the present invention, the results may be rendered in an additional result table, which does not necessarily replace the original, unfiltered table.

In a particular embodiment of the present invention, a "clear filters" control exists which enables the user to erase all filters currently in effect. Optionally, the "clear filters" control may, additionally, reissue the current query with all filters turned off, and update the results on the screen accordingly. In another embodiment, the clear filter is provided to the user as a "Clear filter from [Field Name]," which allows a user to easily determine which filters will be cleared and from which field.

Figure 4:
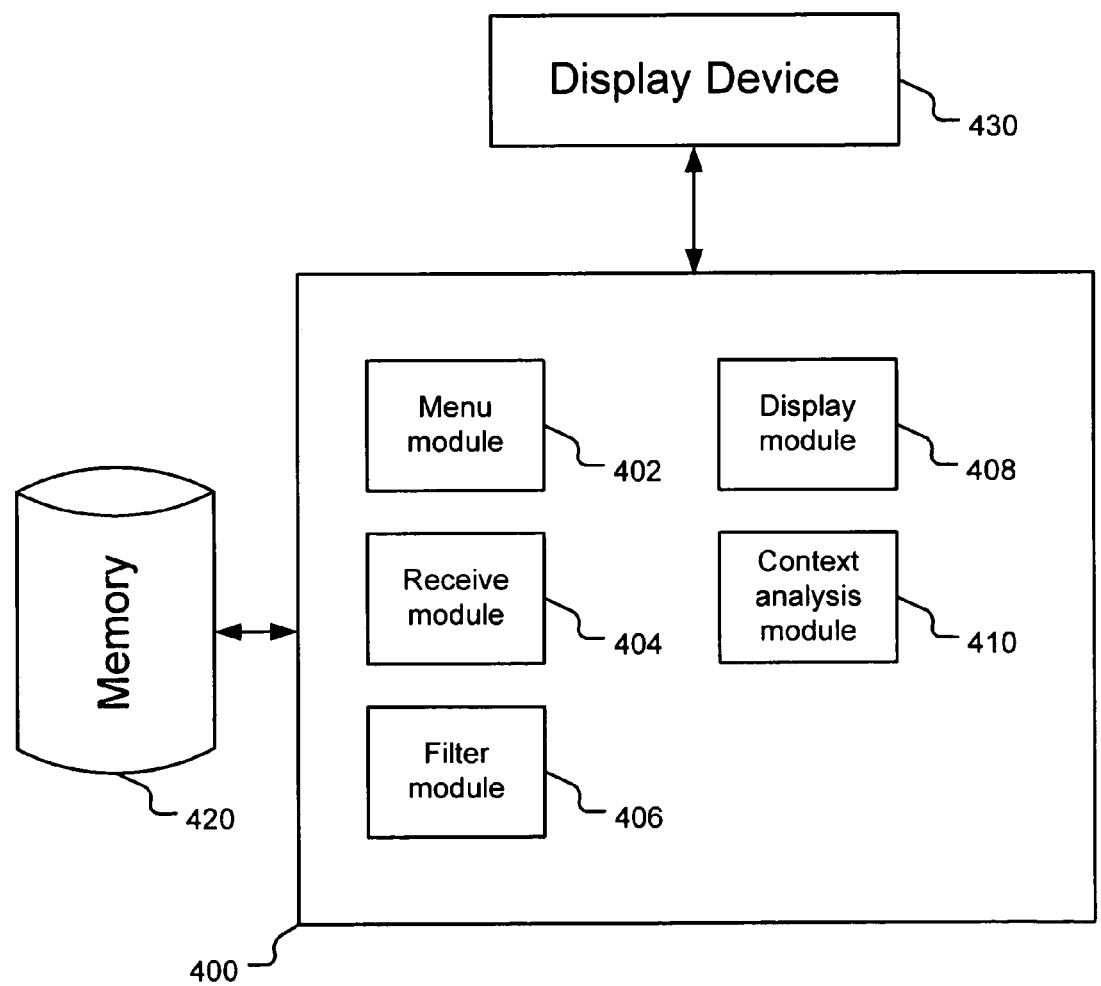
FIG. 4 is a block diagram illustrating the modules that comprise one embodiment of the present invention.

FIG. 4 is a block diagram illustrating the modules that comprise one embodiment of the present invention. An embodiment 400 may communicate with memory 420 when executing a query, performing a filter query, or receiving the results of the filter query. An embodiment 400 also communicates with a display device 430 in order to allow graphical selection of a cell, column, and filter, and to return results of a filter, among other things.

A menu module 402 maintains the filter menu for a particular table column. This may include adding contextually appropriate filter options to a filter menu, removing contextually inappropriate filter options to a menu, and ordering filter options in a filter menu.

A receive module 404 receives signals to filter records and filter selections from a filter menu. Input may be received from a GUI, via keyboard input or other input device, or by automated script or macro.

A filter module 406 creates filters. In an embodiment involving a database, filter module 406 also creates queries associated with the filters, and executes those queries. While SQL is the predominant query language in the database field, filter queries may be created in any query language including specialized versions of SQL such as HQL (Health Query Language), or query languages unrelated to SQL. Execution of a query may occur at the database management system level, or may be delegated to a lower-level program that accesses the database. Queries may be executed on the same system as the database management system is running, or sent out to one or more remote systems for execution. In the case of the latter, the remote system will return results, either directly or indirectly, to the database management system so that the results of the query may be displayed. Filters may also be applied directly to the data by a spreadsheet application, without the use of a query or a database management system.

A display module 408 displays numerous aspects of the present invention. For example, display module 408 may display a table in a spreadsheet or database management system. It may also display the menu of filters, discussed previously in conjunction with FIG. 3. Further, it may display the results of a filter in the form of a table, or other suitable format. Display module 408 may interact with display device 430 to render an element that it is displaying.

Context analysis module 410 analyzes the context of a particular cell or column in a data table. Appropriate (and inappropriate) filters may be derived using predetermined criteria (see discussion of analyze context operation 306 in conjunction with FIG. 3) or other criteria.

FIG. 5 illustrates an example screenshot where a signal to filter has been received (not shown), and a filter menu 502 displayed. Unfiltered records 504 may be seen in the background, as a filter has not yet been selected from the filter menu 502. In the exemplary screenshot, the filter menu 502 was displayed when the user clicked on first a cell (not shown) in the Order Date column 506 (thus selecting Order Date as a key field upon which the subsequent filtering will take place), and then on Common Filters menu item 508, although one skilled in the art will appreciate that this functionality could just as easily have been triggered on a different cell or column and/or with a different menu item, button, mouse or keyboard sequence, or selection of a toolbar element without departing from the scope of the claimed invention.

FIG. 6 illustrates another example screenshot wherein a particular filter 602 is being selected from a filter menu 604. In the exemplary screenshot, the particular filter 602 was selected by hovering a mouse pointer over it and left-clicking, although skilled in the art will appreciate that this selection could also made using other sequences and other input devices without departing from the scope of the claimed invention.

Figure 7:
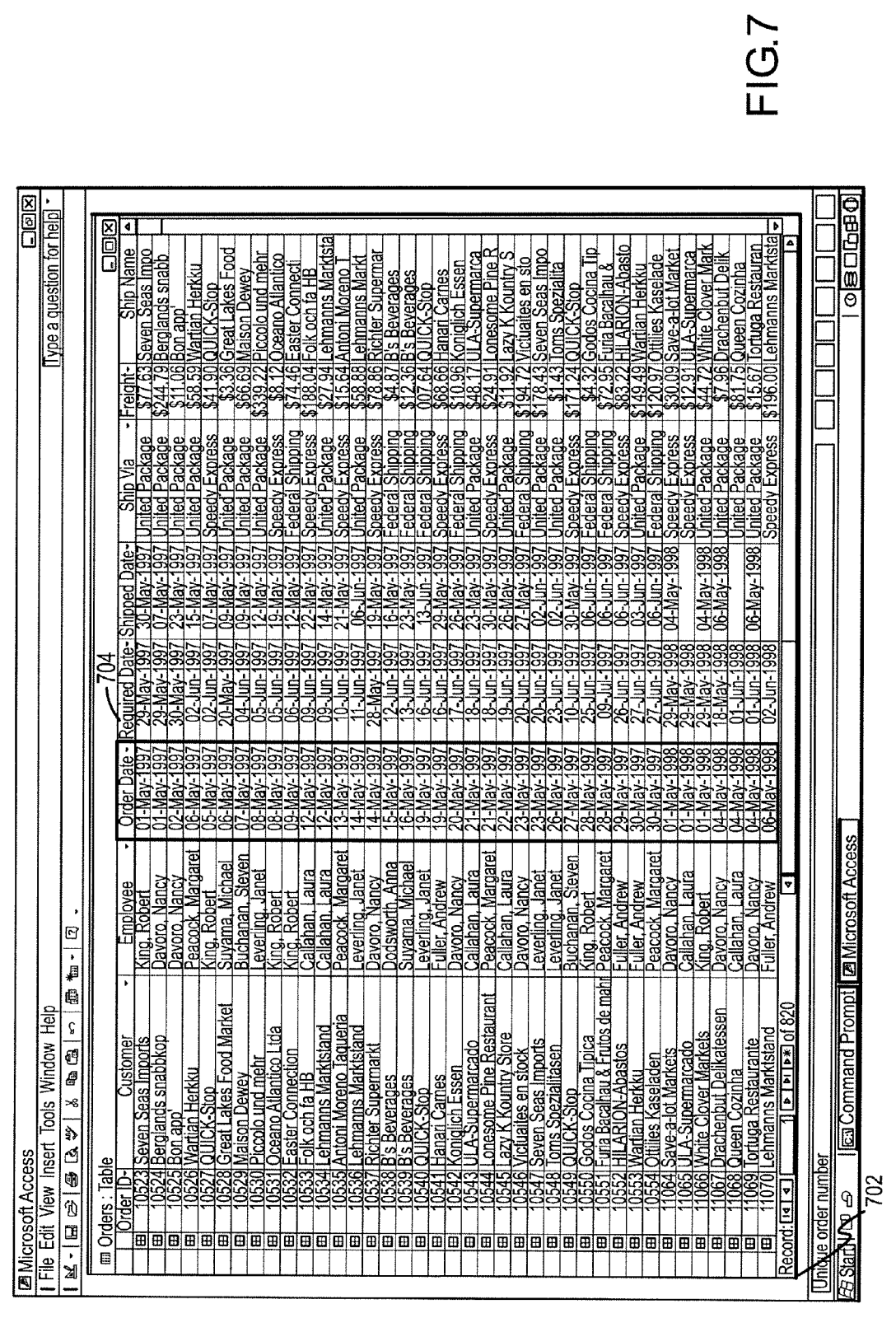

FIG. 7 illustrates another example screenshot wherein the particular filter (not shown; see 602 in conjunction with FIG. 6) has been applied to the unfiltered data (not shown; see 102 in conjunction with FIG. 1), and the resulting filtered data 702 can be seen. The order date column 704 is shaded to draw attention to the fact that the filtered data 702 contains only records with an Order Date key field value in the month of May.

Referring again to FIG. 3, another embodiment of the method for providing filter options comprises the generation of table queries based on a selection of data in a data field. In this alternative embodiment, receive operation 304 receives a signal to filter the table data when a user clicks on an appropriate graphical user interface (GUI) control sequence. Data within a data field is selected, such as by highlighting the data with the cursor, and then right-clicking the mouse on the selected data (the column containing the selected data designates the key field), which causes a context menu signal to be sent to receive operation 304. In an alternate embodiment, left-clicking on the selected data (the column containing cell then becoming the key field) in the table causes a signal to be sent to receive operation 304. One skilled in the art will appreciate that any number of possible GUI controls or command sequences from an input device can be used to select data within a data field and send a signal to filter based on the selected data. Examples include centering the mouse pointer on a selected portion of a data element, accompanied by activating a certain mouse button. Alternatively, the keyboard could be used to make a selection. Alternatively still, a combination of keyboard, mouse, trackball, or other input device actions could be used to select a filter based on the selected data.

In one embodiment, receive operation 304 may interpret the selection of data within a cell as a signal to filter based on the entire column's contents and based on the content of the selection. The selection of data can be a selection of a portion of the data or all the data within the cell. The column containing the selection becomes a "key field." The value(s) in the key field column are used to decide whether each given row is filtered or not. For example, in order to omit from the query results, or "filter out," all orders from a table of product order data that were placed before 2004, the "order date" column must necessarily be a key field for such a query.

When a particular portion of data within a cell is selected (versus an entire column), filter options based on the value within the selection are possible (e.g., see example in FIGS. 8, 9, and 10, discussed later). With respect to an alternative embodiment, data external to the data table can also be incorporated into a filter based on the selection of data. For example, filtering out orders in an order data table from "Today" requires external data (namely, today's date) to be retrieved and incorporated into the query, since the current date and time are always changing and thus not practical to store in a data table.

After receive operation 304 receives a signal to filter, an embodiment of the analyze context operation 306 analyzes the selected data within the cell to determine the context of the selection. The context of the selection can include, but is not limited to, the location of the selected data within the cell and/or what type of data the selection contains. Data filters appropriate to the determined location and/or type of data may then be added to a filter menu, for example, see menus 808, 908, 1008, and 1108 (see FIGS. 8-11, respectively).

Figure 9:
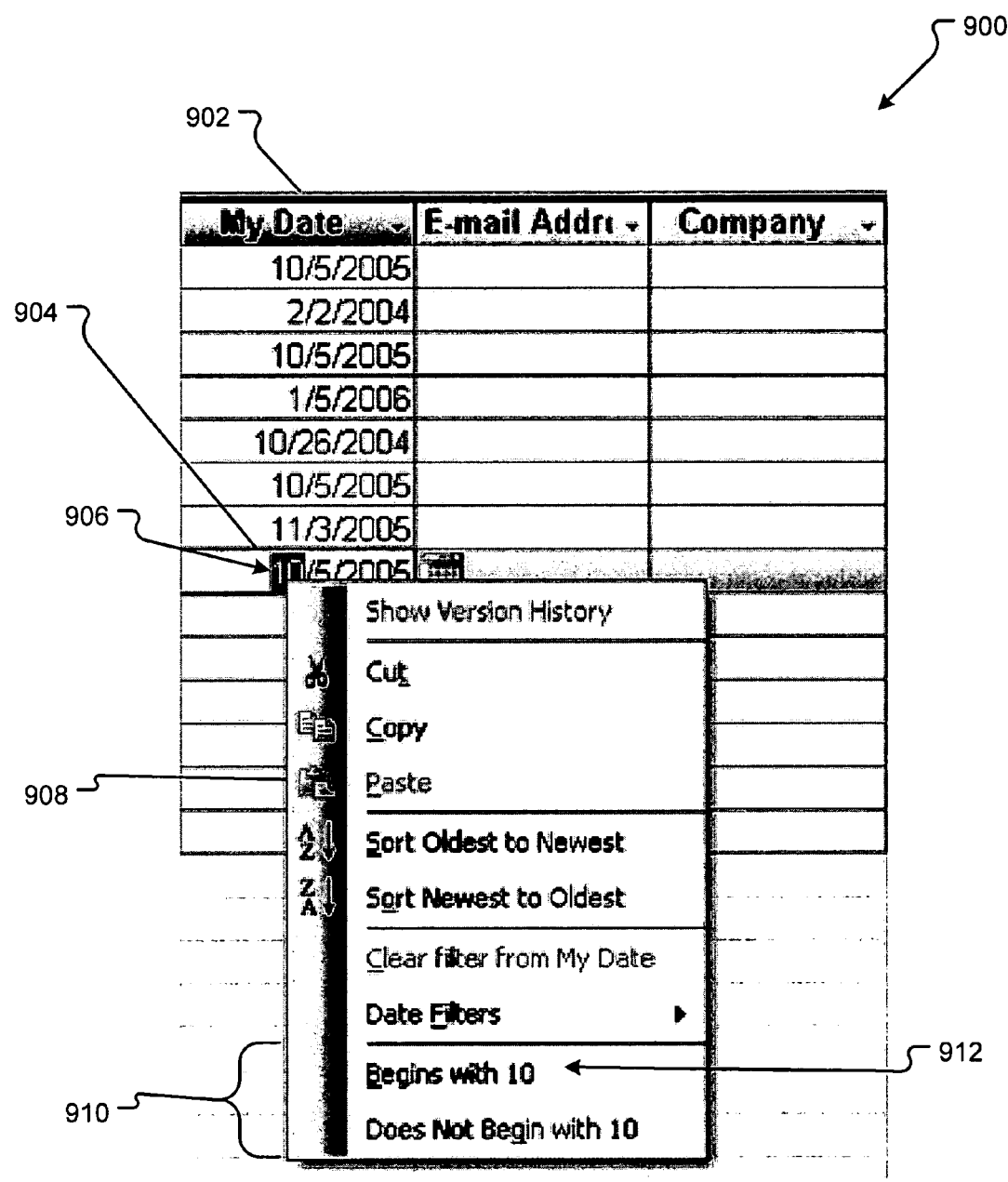
FIG. 9 illustrates another example screenshot where a signal to filter based on a selection of data in a data field has been received, and a filter menu displayed.

For example, if the data type is determined to be a portion of a date, e.g., the month, one or more filters appropriate to that portion of data, e.g., months, will be added to the filter menu (see 908, FIG. 9 for an exemplary filter menu). Such selection-specific filter options might include "This Month," which could be used to filter out all records that do not have a date matching the current month. Similarly, "Last Month" and "Next Month" are also selection-specific filter options that could be added to a filter menu by analyze context operation 304. Other selection-specific filter options might include "This Year," "Last Week," "Last quarter," "Today," etc. Yet other selection-specific filter options might include "Newer than" the month contained in the selection of data, "Older than" the selected data, or "Same month" as the selected data.

In other embodiments, the filter options are related to a position of a selected portion of data within the cell. For example, if the data is located at the beginning of the data within the cell (see selection 906, FIG. 9), one or more filters appropriate to the location of the selection will be added to the filter menu (see selections 910, FIG. 9 for exemplary filter options). Such selection-specific filter options might include "Begins with," which could be used to filter out all records that do not have that same data at the beginning of the cell. Similarly, "Does not begin with" is also a selection-specific filter option that could be added to a filter menu by analyze context operation 304. Other selection-specific filter options based on the location of the selected portion of data might include "Contains," "Does Not Contain," "Ends With," "Does Not End With," etc. Yet other selection-specific filter options might include "X if before Y," "X if after Y," or "X if within Y," etc, when the selected data includes two separate portions of data that are related. Other menu filter options may be excluded from the menu based on the context. For example, if the beginning portion of data is selected, it is nonsensical to provide a filter option "Ends with." Other menu options may be excluded depending on the specific location, data type, or other context of the selection of data.

Figure 8:
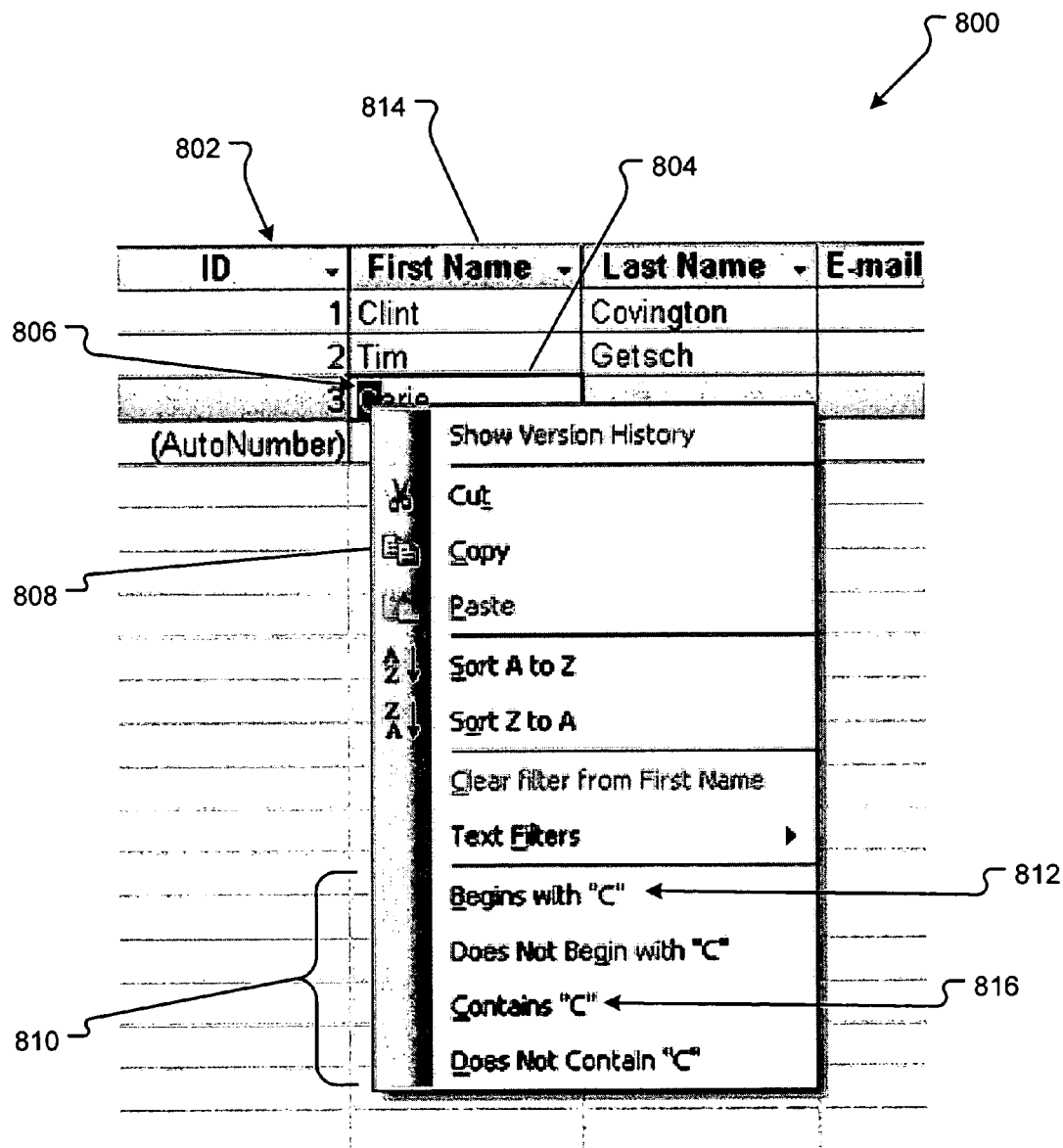
FIG. 8 illustrates an example screenshot where a signal to filter based on a selection of data in a data field has been received, and a filter menu displayed.

After analyze context operation 306 (FIG. 3) adds any appropriate filter options to a filter menu, another embodiment of display operation 308 displays the menu of filter options (for an example of a filter menu, see 808 in FIG. 8). The menu of filter options displayed by display operation 308 includes the filters appropriate for the context of the selected data (such as "Begins With", discussed above).

Referring again to FIG. 4, another embodiment of the receive module 404 receives signals to filter records and filter options from a filter menu based on the selected data within a cell. The input may be received from a GUI, via keyboard input or other input device, or by automated script or macro. Another embodiment of the filter module 406 creates filters based on the selected data. In an embodiment involving a database, filter module 406 creates queries associated with the filters that are based on the selected data, and executes those queries. Another embodiment of the context analysis module 410 analyzes the context of the selection of data within a field, such as a cell. Appropriate filters may be derived using predetermined criteria (see discussion of analyze context operation 306 in conjunction with FIG. 3) or other criteria.

FIG. 8 illustrates an example screenshot 800 where a signal to filter has been received (not shown), and a filter menu 808 displayed. Unfiltered records 802 may be seen in the background because a filter has not yet been selected from the filter menu 808. In the exemplary screenshot 800, the filter menu 808 was displayed after the user (1) selected data 806 in a cell 804 in the First Name column 814 (thus selecting First Name as a key field upon which the subsequent filtering will take place), and then (2) depressed a predetermined mouse button (e.g., the right mouse button). Although one skilled in the art will appreciate that this functionality could just as easily have been triggered on a different cell or column and/or with a menu item, button, a different mouse or keyboard sequence, or selection of a toolbar element without departing from the scope of the claimed invention. The filtering options 810 displayed in the menu 808 are based on the context of the selected portion of data 806. In the exemplary embodiment, the selected data 806 is at the beginning of the data in cell 804. As such, the filtering options 810 are based on this location of the selected data 806. For example, the filtering options 810 include selection 812 that filters if data within a cell in the First Name column 814 "Begins with 'C'." In contrast, the filtering options 810 do not include a filter option for filtering data if the data "Ends with 'C'," because that option would be nonsensical if the first letter of a name is selected, as shown in exemplary screenshot 800. However, the filtering options 810 do include a selection 816 for "Contains 'C'," because it is possible that the filter "Begins with 'C'" would improperly filter some names, e.g., if a person had a name "de Cucina," the "Begins with 'C'" filter may not filter this name.

FIG. 9 illustrates another example screenshot 900 wherein another menu 908 is generated after a filter selection (not shown) is received to filter on a selection of data 906 within a cell 904 in the My Date column 902. Again, the selected data 906 is at the beginning of the data in cell 904. However, this exemplary menu 908 shows an embodiment where the filter options 910 may also be based on the data type context of the selection and the location context of the selection. The My Date column 902 comprises dates with a certain format, i.e., Month/Day/Year. The selected data 906 contains the month. The filter options 910 provide a "Begins with 10" selection 912 but does not include a "Contains 10" option because the "Contains 10" option is nonsensical if the highlighted portion is a month and the month is only located at the beginning of the cell.

Figure 10:
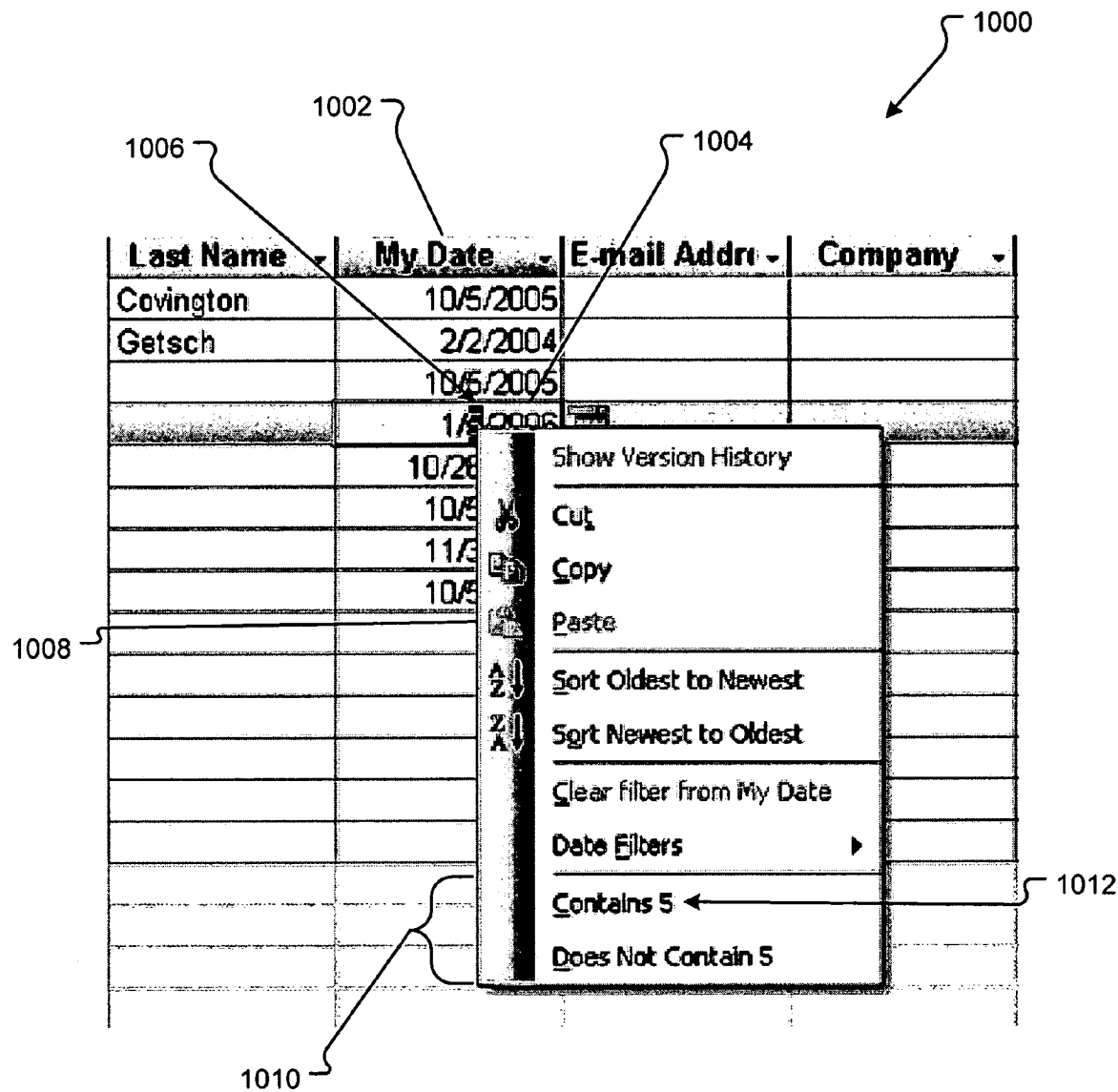
FIG. 10 illustrates another example screenshot where a signal to filter based on a selection of data in a data field has been received, and a filter menu displayed.

FIG. 10 illustrates another example screenshot 1000 wherein another menu 1008 is generated after a filter selection (not shown) is received to filter on a selection of data 1006 within a cell 1004 in the My Date column 1002. In this example, the selected data 1006 is in the middle of the data in cell 1004. The exemplary menu 1008 shows an embodiment where the filter options 1010 include the "Contains 5" selection 1012 but does not include a "Begins with 5" or an "Ends with 5" selection because those options are nonsensical if a day in a date field is selected.

Figure 11:
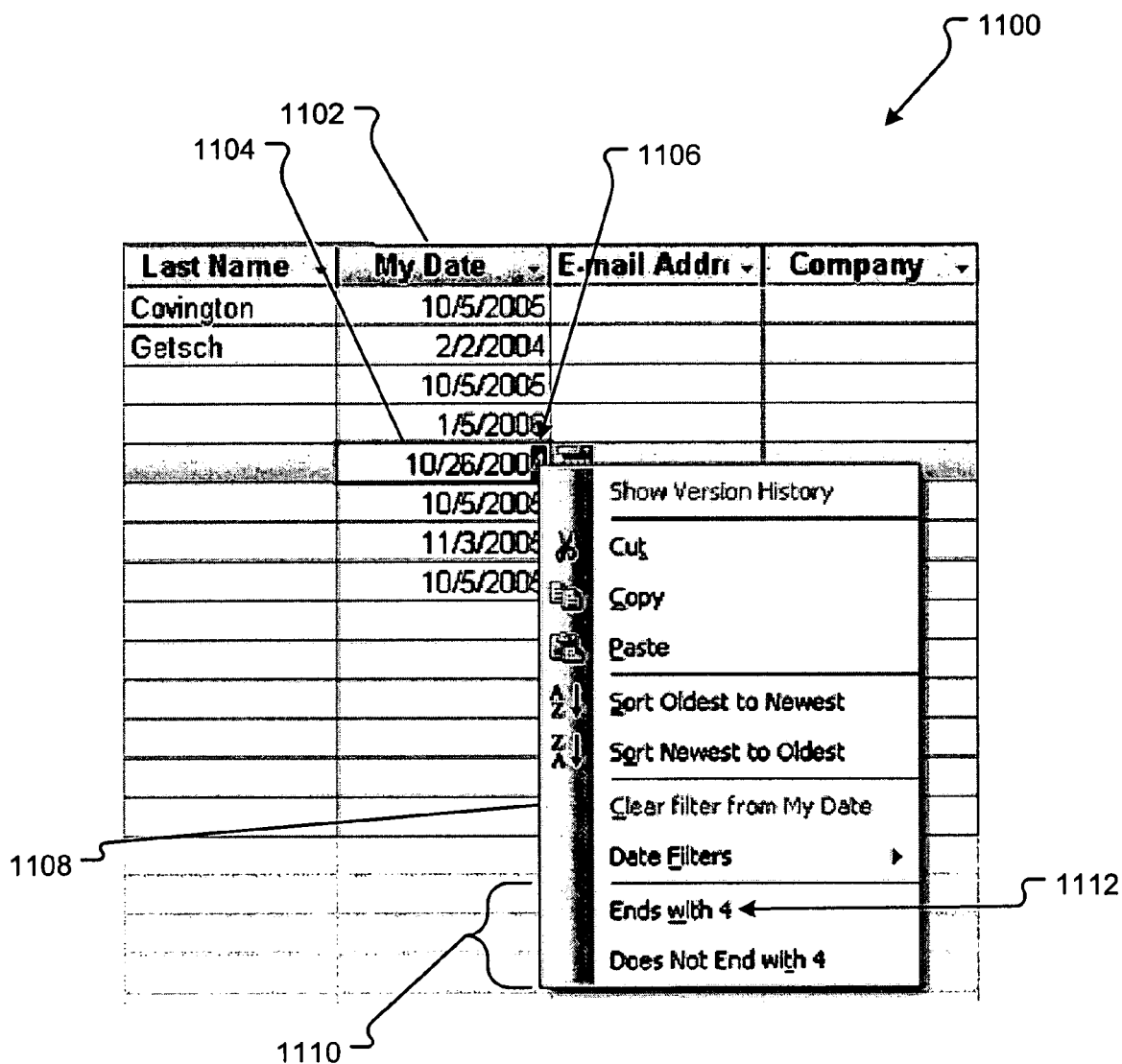
FIG. 11 illustrates another example screenshot where a signal to filter based on a selection of data in a data field has been received, and a filter menu displayed.

FIG. 11 illustrates another example screenshot 1100 wherein another menu 1108 is generated after a filter selection (not shown) is received to filter on a selection of data 1106 within a cell 1104 in the My Date column 1102. In this example, the selected data 1106 is at the end of the data in cell 1104. The exemplary menu 1108 shows an embodiment where the filter options 1110 include the "Ends with 4" selection 1112 but does not include a "Contains 4" or a "Begins with 4" selection because those options are nonsensical if a year in a date field is selected.

By determining the context of a selection of data, the present invention allows the culling or focusing of the filtering options provided to a user. The focusing of the filtering options provides fewer and more applicable options to the user. The limited and focused options alleviate the user's confusion when numerous impracticable or nonsensical menu options are provided. In addition, the limited and focused filtering options allow the user to quickly find the desired filtering selection and, thus, reduce the user's time needed to find and use the filtering option. Overall, the selection-based filtering options improve the user's experience when filtering data.

In one embodiment, the computer program product representing the present invention is an object oriented software program. When a user selects a user interface item to create context-based filtering options, three data items are input into the software program. The three data items include the field name to be used for filtering (e.g., the column name), the type of data that field contains (e.g., the homogeneous data type in the column), and the field value of the current selection (e.g., filter using the number 10, which was selected by the user). The selection of data represents the current selection. The field name and field type are read from a data construct, the FL object, that stores information about the form control bound to the data field. The field type helps specify which specific filters to display. In other words, only certain filters are displayed depending on the field type value, e.g., "Greater than" for numeric data or "Ends with" for textual data. In addition, only certain filters are displayed depending on the location of the data selected, the type of the data selected, both the location and type of the data selected, or for other contextual reason.

To apply the filter, a set of C++ classes adds or removes SQL WHERE clauses from the document's filter properties. The QuickSortFilterOption is an abstract base class and cannot be instantiated. The QuickFilterOption class inherits from QuickSortFilterOption and also cannot be instantiated. QuickFilterBySelOption inherits from QuickFilterOption. QuickFilterBySelOption objects generate and/or remove filters that incorporate the currently selected data or incorporate user-supplied values. Thus, QuickFilterBySelOption objects use the field value of the current selection to create filters, such as Equals "<formatted field value>" or "Greater than <formatted field value>." CommonFilterOption also inherits from QuickFilterOption and generates or removes all common filters that do not depend on a specific data selection, for example, "Equals Today," or "Before Last Year." ClearColumnFilterOption also inherits from QuickFilterOption and removes either all filters from the document or filters that apply to a particular field.

An input to all these objects is a command ID that represents the filtering scenario to run, and the control(s) to which to apply the filter. The output of the objects is a string containing the SQL WHERE clause(s) of the new filter.

One skilled in the art will appreciate that while the exemplary embodiments deal with only one filter for the sake of simplicity, multiple filters applied to multiple columns may be in effect simultaneously, thus allowing interaction of filters to more precisely focus a filter query. One skilled in the art will likewise appreciate that while exemplary embodiments were presented in the contexts of a spreadsheet, and a database application, the invention could be used in any context where specific data must be selected from a dataset. Further, the resulting specific data need not be displayed. It could instead be saved to memory, sent to a printer, emailed, or otherwise directed without departing from the scope of the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for graphical construction of filter queries, the method comprising:

displaying on a display device a table of data through a user interface;

receiving a signal from a user through the user interface to select a portion of data in a cell of the displayed table, wherein the selected portion of data is a key field with a value used in filtering;

analyzing a context of the selection of the portion of data to determine the context of the data, wherein the context of the selection of the portion of data is defined by characteristics of the selection of the portion of data, and wherein the analysis is based upon a type of the selected portion of data;

generating a menu of filters based on the context of the selection of the portion of data, wherein the content of the menu of filters is automatically generated in response to the analysis of the selected portion of data, and wherein the content of the menu of filters comprises filters specifically related to the context of the selected portion of data and default filters appropriate for any context;

displaying on the display device the menu of filters in proximity to the selected portion of data, wherein the menu of filters is displayed such that it overlaps the table of data;

receiving a filter selection from said menu of filters;

generating a filter query, wherein the value of the key field is used to determine whether a given row is filtered;

applying the generated filter query to the table of data, wherein applying the generated filter query comprises:

determining whether an existing filter is applied to the table of data;

if an existing filter is applied to the table of data, determining whether the existing filter currently applied to the data table is mutually exclusive to the filter selection;

based upon the determination, automatically removing the currently applied filter from the data table if the existing filter and the filter selection is mutually exclusive, wherein the selected filter is applied to the table of data after the existing filter is removed;

if the existing filter is not mutually exclusive to the filter selection, applying the filter selection in conjunction with the existing filter; and if there is no existing filter, creating an Original filter based upon the filter selection and applying the Original filter to the table of data; and displaying on the display device a table of results from applying the generated filter query to the table of data.

2. A computer-implemented method as defined in claim 1, further comprising issuing the filter query.

3. A computer-implemented method as defined in claim 1, further comprising displaying results associated with the filter query.

4. A computer-implemented method as defined in claim 1, wherein analyzing a context of the selection of a portion of data further comprises determining a data type of a field.

5. A computer-implemented method as defined in claim 1, wherein analyzing a context of the selection of a portion of data further comprises determining a data type of the selection of a portion of data.

6. A computer-implemented method as defined in claim 1, wherein analyzing a context of the selection of a portion of data further comprises determining a location of the selection of a portion of data within a field.

7. A computer-implemented method as defined in claim 1, wherein analyzing a context of the selection of a portion of data further comprises removing an inappropriate filter from the filter menu.

8. A computer-implemented method as defined in claim 1, wherein one or more contents of the menu of filters is configurable by the user.

9. A computer-implemented method as defined in claim 1, further comprising: receiving specific filter values from the user in a binary fashion.

10. A computer-implemented method as defined in claim 1, wherein the creating an Original filter is further based on the context and the method further comprises creating an associated filter query based on the context.

11. A computer storage medium encoding a computer-implemented method for filtering data based on a context of a selection of data, the method comprising:

displaying a data table through a user interface;

receiving a selection of a portion of data in a cell of the displayed table from a user through the user interface, wherein the selection of the portion of data is a key field with a value used in filtering data table;

analyzing a context of the selection of the portion of data in a cell to determine the context of the data, wherein the context of the selection of the portion of data is defined by characteristics of the selection of the portion of data, and wherein the analysis is based upon a type of the selected portion of data and a position of the selected portion of data;

generating a menu of filter options based on the context of the selection of the portion of data, wherein the content of the menu of filters is automatically generated in response to the analysis of the selection of the portion of data, and wherein the content of the menu of filter options includes filters specifically related to the context of the selection of data and default filters appropriate for any context;

displaying the menu of filter options in proximity to the selected portion of data, wherein the menu of filter options is displayed such that it overlaps the table of data;

receiving a filter selection from said menu of filters;

generating a filter query, wherein the value of the key field is used to determine whether a row is filtered by the filter query;

applying the generated filter query to the table of data, wherein applying the generated filter query comprises:

determining whether an existing filter is applied to the table of data;

if an existing filter is applied to the table of data, determining whether the existing filter currently applied to the data table is mutually exclusive to the filter selection;

based upon the determination, automatically removing the currently applied filter from the data table if the existing filter and the filter selection is mutually exclusive, wherein the selected filter is applied to the table of data after the existing filter is removed;

if the existing filter is not mutually exclusive to the filter selection, applying the filter selection in conjunction with the existing filter; and if there is no existing filter, creating a Original filter based upon the filter selection and applying the Original filter to the table of data; and displaying a table of results from applying the filter selection to the table of data.

12. The computer storage medium as defined in claim 11, further comprising:

creating an associated filter query; and performing the filter query.

13. The computer storage medium as defined in claim 11, wherein creating a Original filter further comprises retrieving data from the selection of a portion of data for use in the Original filter.

14. The computer storage medium as defined in claim 11, wherein analyzing a context of the selection of data comprises one of:

analyzing the data type of the selection of a portion of data; and analyzing the location of the selection of a portion of data within a field.

15. The computer storage medium of claim 11, wherein the selected portion of data comprises data selected from a cell in a spreadsheet application.

16. The computer storage medium of claim 11, wherein the menu of filter options comprises a clear filters option which removes all filters applied to the table of data.

* * * * *